(12) United States Patent
Brown et al.

(10) Patent No.: US 6,711,513 B2
(45) Date of Patent: Mar. 23, 2004

(54) FAULT TOLERANT APPARATUS AND METHOD FOR DETERMINING A REVOLUTION RATE OF A GEAR

(75) Inventors: David R. Brown, League City, TX (US); Matthew C. Meyer, Irvine, CA (US); Ajay P. Mishra, Irvine, CA (US); Jeffrey A. Norris, Lake Forest, CA (US); David C. Rasmussen, Placentia, CA (US)

(73) Assignee: Ivensys Systems, Inc., Irvine, CA (US)

( * ) Notice: Subject to any disclaimer, the term of this patent is extended or adjusted under 35 U.S.C. 154(b) by 0 days.

(21) Appl. No.: 10/136,334

(22) Filed: May 2, 2002

(65) Prior Publication Data

US 2003/0208329 A1 Nov. 6, 2003

(51) Int. Cl.[7] .............................................. G06F 19/00
(52) U.S. Cl. ........................... 702/79; 702/79; 702/115; 702/124; 702/189; 73/1.27; 73/506; 377/20; 377/29; 377/37; 377/39; 324/392; 324/676; 324/710
(58) Field of Search ............................... 702/33, 56, 66, 702/75, 78–80, 113, 115, 124–126, 142–145, 148, 182–184, 187, 189, 190, 193, FOR 103, 104, 107, 110, 134, 136, 150, 164, 170, 171; 73/1.27, 204.14, 506; 324/392, 676, 710; 377/3, 12, 15–16, 20, 29, 37–39, 44–49

(56) References Cited

U.S. PATENT DOCUMENTS

| | | | |
|---|---|---|---|
| 3,870,947 A | | 3/1975 | Fields |
| 4,081,995 A | * | 4/1978 | Griffith et al. ................ 73/116 |
| 4,191,144 A | * | 3/1980 | Nohira et al. ........... 123/117 R |
| 4,369,915 A | | 1/1983 | Oberg et al. |
| 4,547,683 A | | 10/1985 | Bingham |
| 4,841,276 A | * | 6/1989 | Abel et al. .................... 340/466 |
| 4,953,531 A | * | 9/1990 | Abe ........................... 123/414 |
| 5,287,070 A | | 2/1994 | Thelen et al. |
| 5,434,800 A | * | 7/1995 | Davis et al. ................. 364/550 |
| 5,537,583 A | | 7/1996 | Truong |
| 5,596,153 A | | 1/1997 | Bulgrien et al. |
| 5,613,064 A | | 3/1997 | Curtin |
| 6,141,769 A | | 10/2000 | Petivan et al. |

OTHER PUBLICATIONS

Baba et al., "A Novel Sbpixel Edge Detection System for Dimension Measurement and Object Localization Using an Analogue–Based Approach", Dec. 2000, IPP, Vol: 3, pp. 276–283.*

* cited by examiner

*Primary Examiner*—Marc S. Hoff
*Assistant Examiner*—Elias Desta
(74) *Attorney, Agent, or Firm*—Cooley Godward LLP (57) ABSTRACT

A measurement system and method for determining a revolution rate of a rotating gear is described. Such a rotating gear can be, for example, a turbine or compressor. The described measurement system and method, for example, can perform highly accurate measurements and can be a fault tolerant system providing high reliability. In one embodiment, an apparatus comprises an edge detector, a memory and a pulse-input engine. The edge detector is configured to receive an input signal and a counter signal. The edge detector is further configured to send a set of time values based on the input signal and the counter signal. The pulse-input engine is configured to measure a set of pulse-to-pulse delays based on the set of time values stored in the memory.

29 Claims, 10 Drawing Sheets

FAULT TOLERANT APPARATUS AND METHOD FOR DETERMINING A REVOLUTION RATE OF A GEAR

BACKGROUND

The invention relates generally to highly accurate measurements and more particularly to a fault tolerant system and method for accurately determining a revolution rate of a rotating gear.

Known measurement systems can measure the revolution rate of a rotating gear based on the elapsed time for a point on the gear to pass over a sensor during a complete rotation. Such a rotating gear can be, for example, a turbine or compressor.

Such measurement systems, however, present special challenges when used for applications involving high reliability. For example, transient noise if not properly rejected can cause measurement errors. Such transient noise can be introduced into the measurement system by, for example, low amplitude or slow input signals; electromagnetic compatibility (EMC) transients; or module hot inserts or spare removals. Similarly, power surges if not properly addressed can cause the measurement system to fail. In addition, any sensor failure (e.g., relating to a broken sensor or broken wire to the sensor) should be detected quickly so that repairs can be made and the proper performance of the measurement system is assured.

Thus, a need exists for a fault tolerant system and method for accurately determining a revolution rate of a rotating gear.

SUMMARY OF THE INVENTION

An apparatus comprises an edge detector, a memory and a pulse-input engine. The edge detector is configured to receive an input signal and a counter signal. The edge detector is further configured to send a set of time values based on the input signal and the counter signal. Each time value from the set of time values is uniquely associated with a detected edge transition from the input signal. The memory is coupled to the edge detector. The memory is configured to receive from the edge detector the set of time values. The memory is configured to store the set of time values. The pulse-input engine is coupled to the memory. The pulse-input engine is configured to measure a set of pulse-to-pulse delays based on the set of time values stored in the memory.

DETAILED DESCRIPTION

A measurement system comprises an edge detector, a memory and a pulse-input engine. The edge detector receives an input signal having pulses corresponding to the teeth of a rotating gear being measured. The edge detector also receives a counter signal. The edge detector detects edge transitions form the input signal and sends a set of time values based on the input signal and the counter signal. Each time value from the set of time values is uniquely associated with the detected edge transition from the input signal. The memory receives from the edge detector the set of time values, and stores the set of time values. The pulse-input engine measures a set of pulse-to-pulse delays based on the set of time values stored in the memory. A set of main processors can then calculate revolutions per minute (RPM) of the measured gear based on the pulse-to-pulse delays.

In one embodiment, the measurement system is a triple redundant system having three independent input channels within the pulse-input module each being uniquely associated with one of three main processors. The three input channels can operate in parallel and isolated from each other. Thus, if a hardware failure occurs on one channel, the other channels can override it. In addition, the faulting module can be easily removed and replace without interrupting the operation of the remaining modules. The three main processors can use a two-out-of-three voting to provide high-integrity error-free, uninterrupted process operations without a single point of failure.

Figure 1:
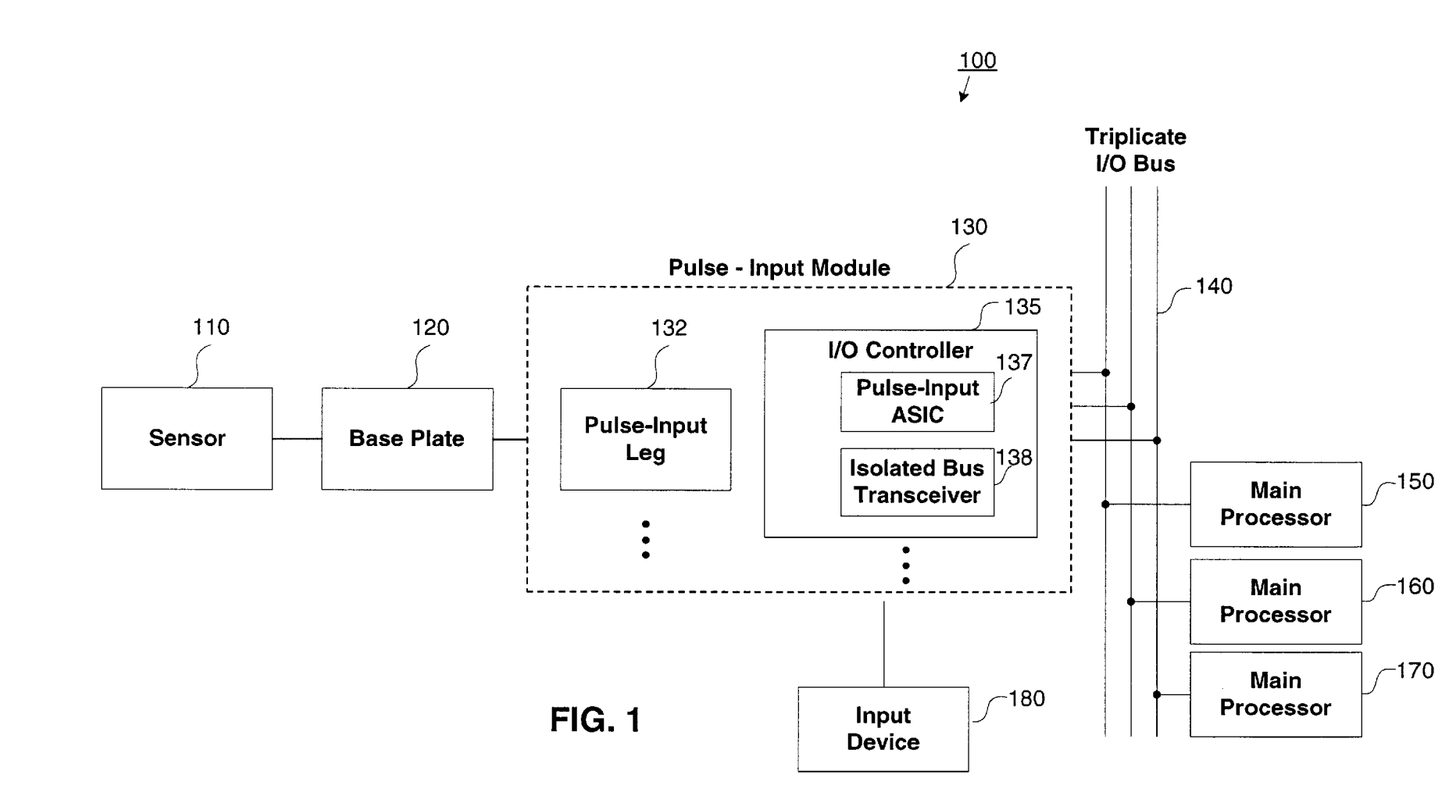
FIG. 1 shows a system block diagram of a measurement system, according to an embodiment of the invention.

FIG. 1 shows a system block diagram of a measurement system, according to an embodiment of the invention. As shown in FIG. 1, measurement system 100 includes sensor 110, baseplate 120, pulse-input module 130, triplicate input/output (I/O) bus 140, main processors 150, 160 and 170 and input device 180. Pulse-input module 130 includes a set of pulse-input legs 132 and a set of I/O controllers 135. Each I/O controller 135 includes pulse-input application specific integrate circuit (ASIC) 137 and isolated bus transceiver 138. Sensor 110 is coupled to baseplate 120, which is coupled to pulse-input module 130. Pulse-input module 130 is coupled to triplicate I/O bus 140, which is coupled to main processors 150, 160 and 170.

Sensor 110 measures the rotation of an adjacently disposed rotating gear. Sensor 110 can be, for example, a passive magnetic sensor or an active speed sensor. A passive magnetic sensor can have, for example, a permanent magnet wrapped with a coil of wire. Any change in inductance at the sensor input produces a change in flux and results in an output voltage. The output of such a magnetic type of sensor is proportional to the speed of and proximity to the teeth of the rotating gear. An active speed sensor can have, for example, a power source and Hall Effect sensors, and output a ground-referenced signal. Such an active speed sensor can include a power supply, for example, a 5V, 12V or 24V, etc. power supply appropriate for the particular active speed sensor. Although not explicitly discussed herein, in one embodiment, the measurement system can be configured to monitor the functioning of the power supply.

Baseplate 120 provides the field connections of power and I/O for the sensor 110, and connects sensor 110 to the pulse-input module 130. Baseplate 120 can have a network of headers, jumpers and resistors so that any of the various types of sensors can be coupled to the base-plate 120 and operable with pulse-input module 130.

Pulse-input module 130 receives a signal from the sensor 110 through the baseplate 120. The received signal indicates the voltage transitions from the sensor 110 and corresponds to gear teeth rotating in proximity of sensor 110. Every input transition is sampled and time is measured for an optimized number of input gear pulses. The resulting time values are used to generate pulse-to-pulse delays, which are provided to the main processors 150, 160 and 170 via triplicate I/O bus 140.

More specifically, pulse-input module 130 includes a set of independent input channels, each of which includes its own pulse-input leg 132 and I/O controller 135. For example, the pulse-input module 130 can include three independent input channels A, B and C. Each of these three independent input channels A, B and C can include their own pulse-input leg 132, also referred to herein as pulse-input legs A, B and C, respectively, and their own I/O controllers 135, also referred to herein as I/O controllers A, B and C, respectively.

Input device 180 receives sensor information from a user and provides that sensor information to the pulse-input module 130. The sensor information can include, for example, a sensor-type indication, a gear-teeth-number indication, an edge-type indication and/or a field-voltage indication if the senor-type indication is an active sensor indication. Based on these indications, the pulse-input module 130 can perform calculations that take into account the characteristics of the sensor 110 being measured. In particular, various calculations discussed below in reference to the pulse-input module 130 are based on, for example, the number of gear teeth, etc.

Note that although the embodiments discussed herein refer to a triple redundant system (e.g., having three independent input channels within the pulse-input module each being uniquely associated with one of the three main processors), any number of subsystems is possible including just a single subsystem. In other words, in other embodiments of the measurement system, the number of independent input channels within the pulse-input module and corresponding main processors can be one or more as appropriate for a given application. For application requiring a significant degree of safety and availability, such as power generation, at least triple redundancy is typically appropriate.

Figure 2:
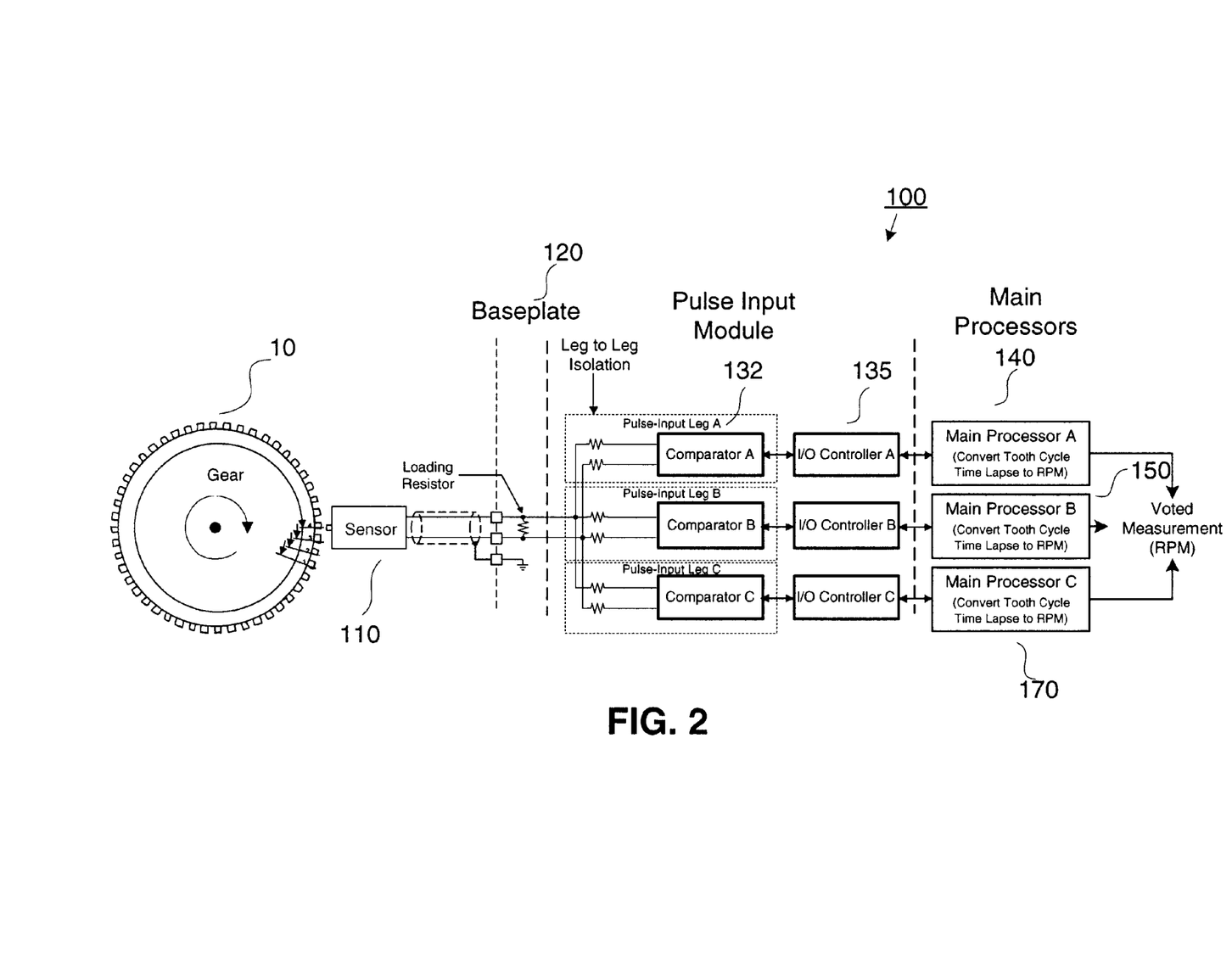
FIG. 2 shows a gear and a portion of the measurement system shown in FIG. 1.

FIG. 2 shows a gear and a portion of the measurement system shown in FIG. 1. As shown in FIG. 2, gear 10 is disposed adjacent to sensor 110 of measurement system 100. The rotation of gear 10 (shown in FIG. 2 in a clockwise manner) is measured by sensor 110, which provides a signal to baseplate 120. The baseplate 120 provides that signal to the three pulse-input legs 132 A, B and C, each of which includes a filter network that performs leg-to-leg isolation filtering, and a comparator network. Pulse-input legs 132 A, B and C, and I/O controllers 135 A, B and C, respectively, independently calculate pulse-to-pulse delays and provide those values to main processors 140, 150 and 160, respectively. Main processors 140, 150 and 160 then collectively determine a voted pulse rate value, also referred herein as a voted measurement of the revolutions per minute (RPM).

Figure 3:
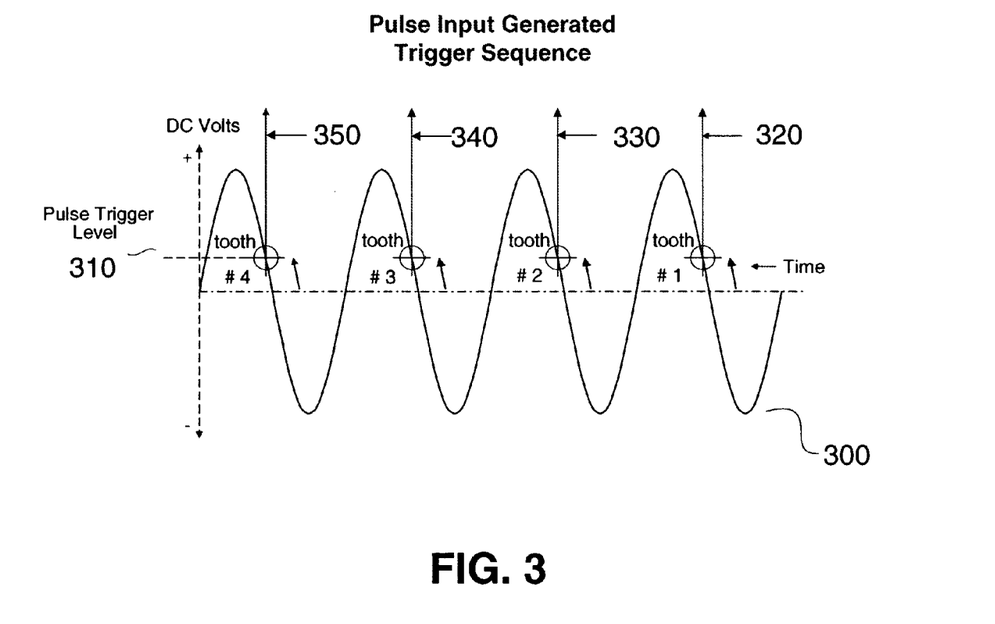
FIG. 3 shows an example of a signal produced by the sensor based on the gear shown in FIG. 2.

FIG. 3 shows an example of a signal produced by the sensor based on the gear shown in FIG. 2. As shown in FIG. 2, the signal 300 produced by sensor 110 is a sinusoidal signal that corresponds to the four teeth of gear 10. These four teeth of gear 10 are labeled in FIG. 2 as 1 through 4. The signal 300 is provided from sensor 110 to pulse-input module 130, which detects the raising edges or trailing edges of the received signal. Each of these raising edges or trailing edges corresponds to a gear tooth rotating to a position adjacent to the sensor 110.

FIG. 3 shows the case where the raising edges of the received signal are detected. More specifically, as the raising edge of signal 300 reaches the pulse trigger level 310, a pulse is generated. Thus, as the signal 300 reaches the pulse trigger level 310 for gear teeth 1 through 4, pulses 320, 330, 340 and 350, respectively, are generated.

Figure 4:
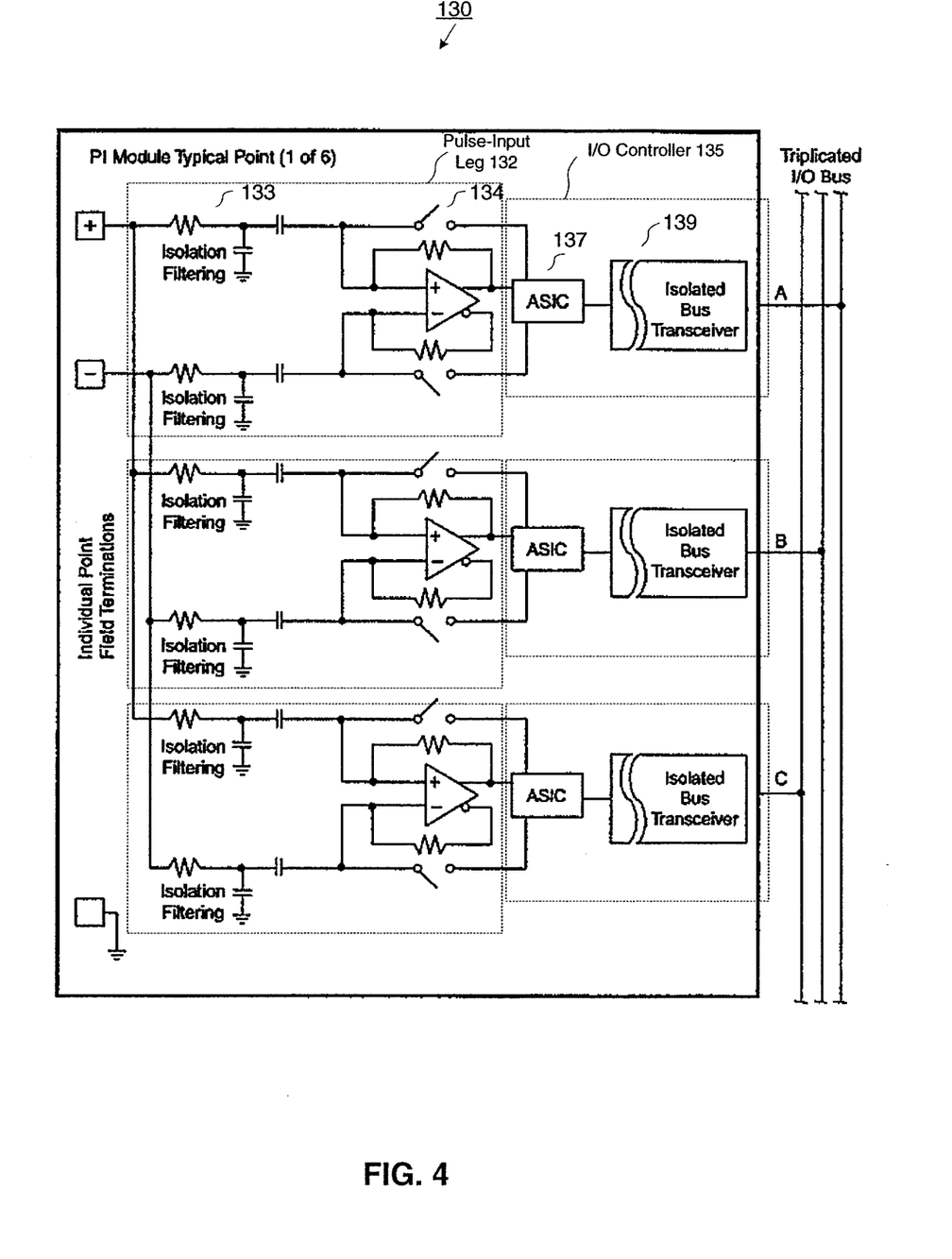
FIG. 4 shows a system block diagram of the pulse-input module shown in FIGS. 1 and 2.

FIG. 4 shows a system block diagram of the pulse-input module shown in FIGS. 1 and 2. As shown in FIG. 4, the pulse-input module 130 includes pulse-input legs 132 and I/O controllers 135. Each pulse-input leg 132 includes a filter network 133 and comparator network 134. Each comparator network 134 includes a set of switches that allow comparator network 134 to receive a test-pulse signal from the zero-speed tester 740 (shown in FIG. 7). Each I/O controller 135 includes pulse-input ASIC 137 and isolated bus transceiver 139.

Figure 5:
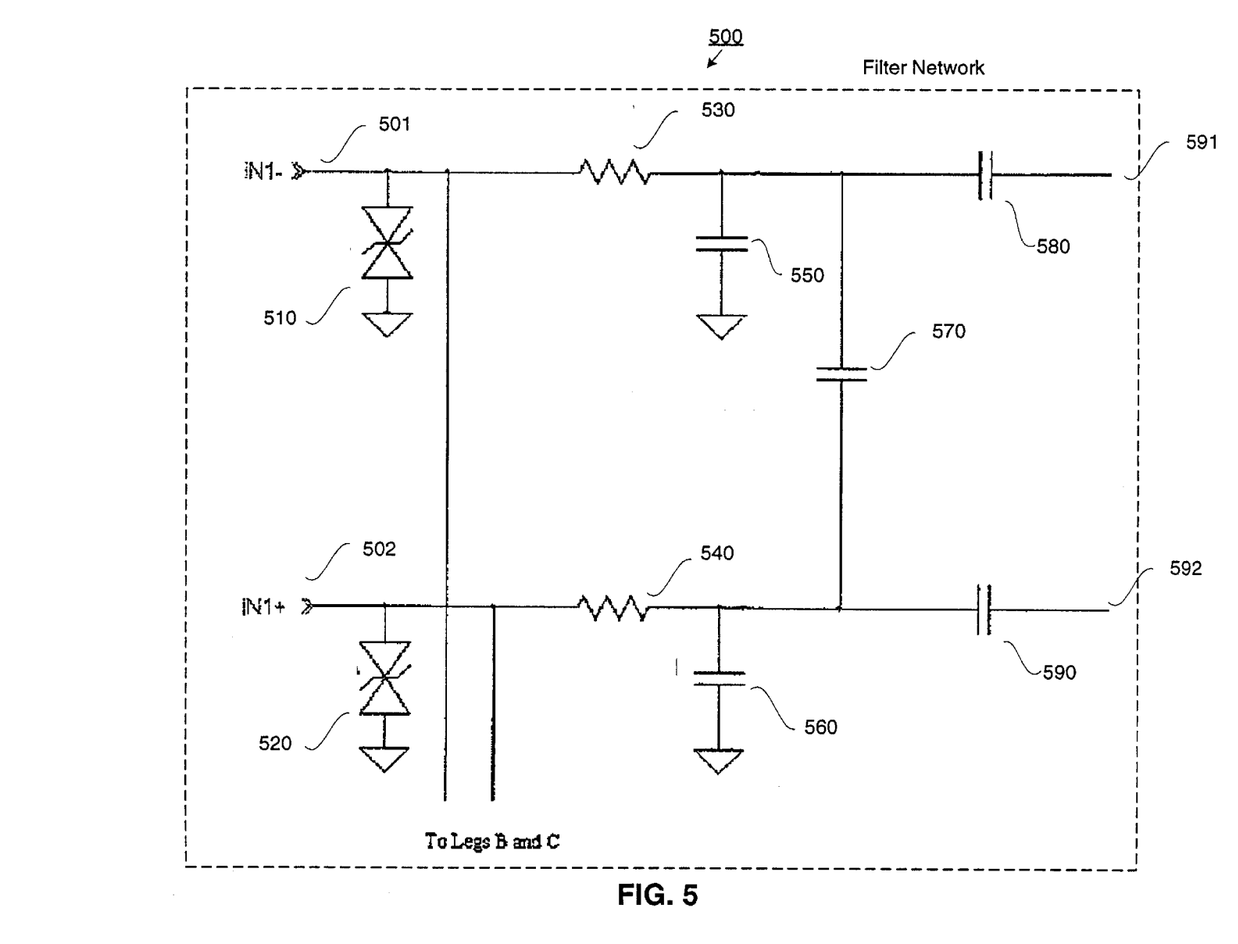
FIG. 5 shows a system block diagram of the filter network of the pulse-input leg shown in FIG. 4.

FIG. 5 shows a system block diagram of the filter network of the pulse-input leg shown in FIG. 4. The filter network 500 includes bi-directional transzorbs 510 and 520, resistors 530 and 540, and capacitors 550, 560, 570, 580 and 590. The filter network 500 receives the input voltage signals from base-plate 120 at points 501 and 502 and forwards the conditioned signals to the comparator network 600 (shown in FIG. 6) from points 591 and 592.

The filter network 500 clamps the input voltages of the received signal, provides leg-to-leg isolation and filters the received signal. More specifically, the bi-directional transzorbs 510 and 520 clamps input noise and the electromagnetic compatibility (EMC) transients. The resistors 530 and 540 form a low pass filter and provide leg-to-leg isolation. The capacitors 560 through 590 perform signal conditioning. In this embodiment, the bi-directional transzorbs 510 and 520 are 36 V transzorbs and the resistors 530 and 540 each have 15 K ohm resistance. In other embodiments, these components can have other values.

Figure 6:
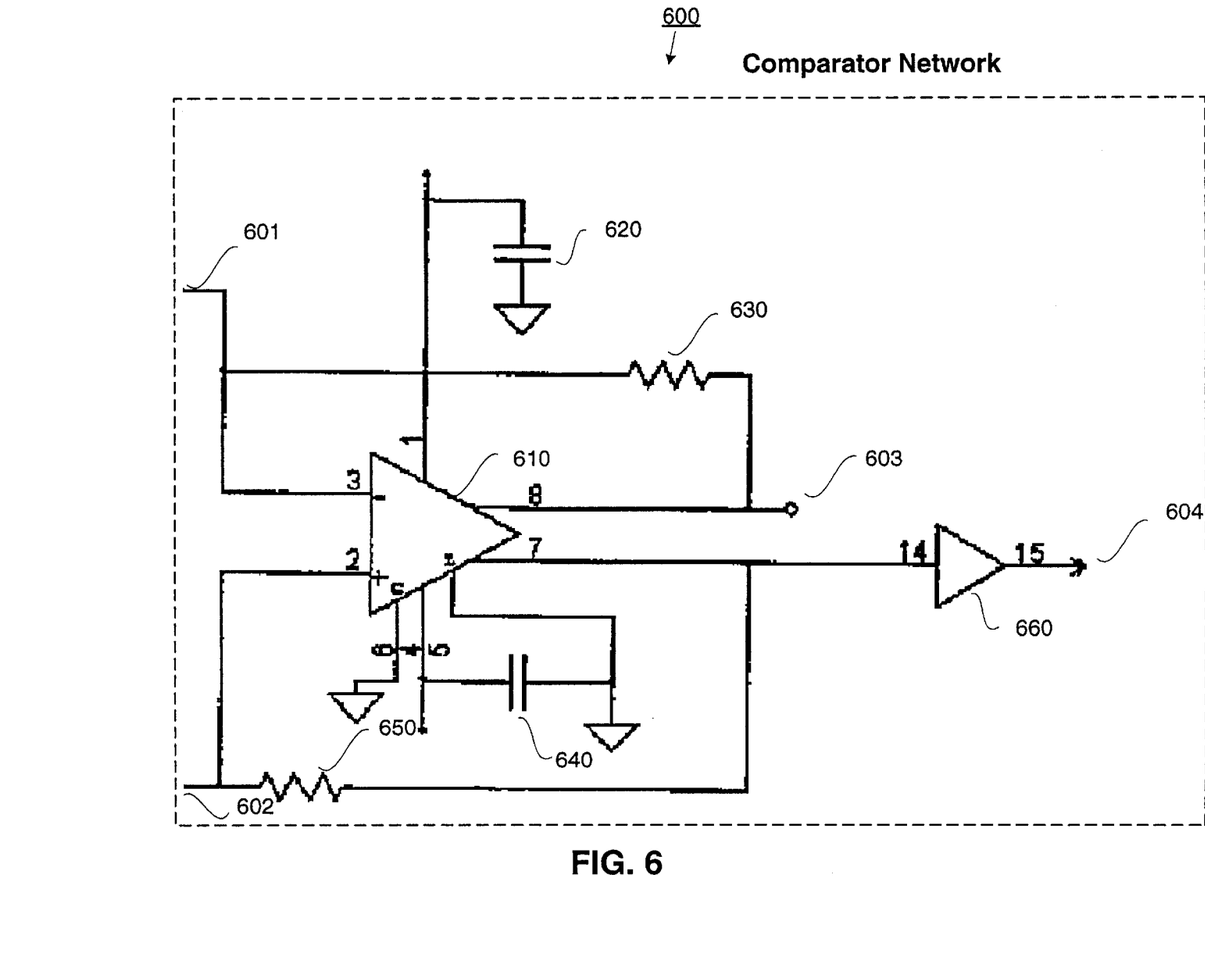
FIG. 6 shows a system block diagram of the comparator network of the pulse-input leg shown in FIG. 4.

FIG. 6 shows a system block diagram of the comparator network of the pulse-input leg shown in FIG. 4. Comparator network 600 corresponds to the comparator network 137 shown in FIG. 4. As shown in FIG. 6, comparator network 600 receives signals at points 601 and 602 and sends signals from points 603 and 604. Although not shown, protection circuitry can be disposed between points 601 and 602 of comparator network 600 and points 591 and 592 of filter network 500 (shown in FIG. 5).

Comparator network 600 includes comparator 610, capacitors 620 and 630, resistors 630 and 640, and buffer 660. Comparator 610 includes ports 1 through 8. Comparator 610 has balanced input with hysteresis on both sides. For example, resistor 630 couples ports 3 and 8 of comparator 610. Similarly, resistor 630 couples ports 2 and 7 of comparator 610. Port 1 of comparator 610 is coupled to capacitor 620, which is tied to ground. Similarly, port 4 of comparator 610 is coupled to capacitor 640, which is tied to ground. In addition, ports 5 and 6 of comparator 610 are coupled to ground.

Port 7 of comparator 610 is coupled to buffer 660. Port 7 of comparator 610 outputs a signal having a train of pulses, which are buffered by buffer 660. The pulses of the signal can have, for example, a frequency from 0.5 to 32,000 Hz. These pulses of the signal are output from buffer 660 to the pulse-input ASIC 137 (shown in FIGS. 1 and 4).

Figure 7:
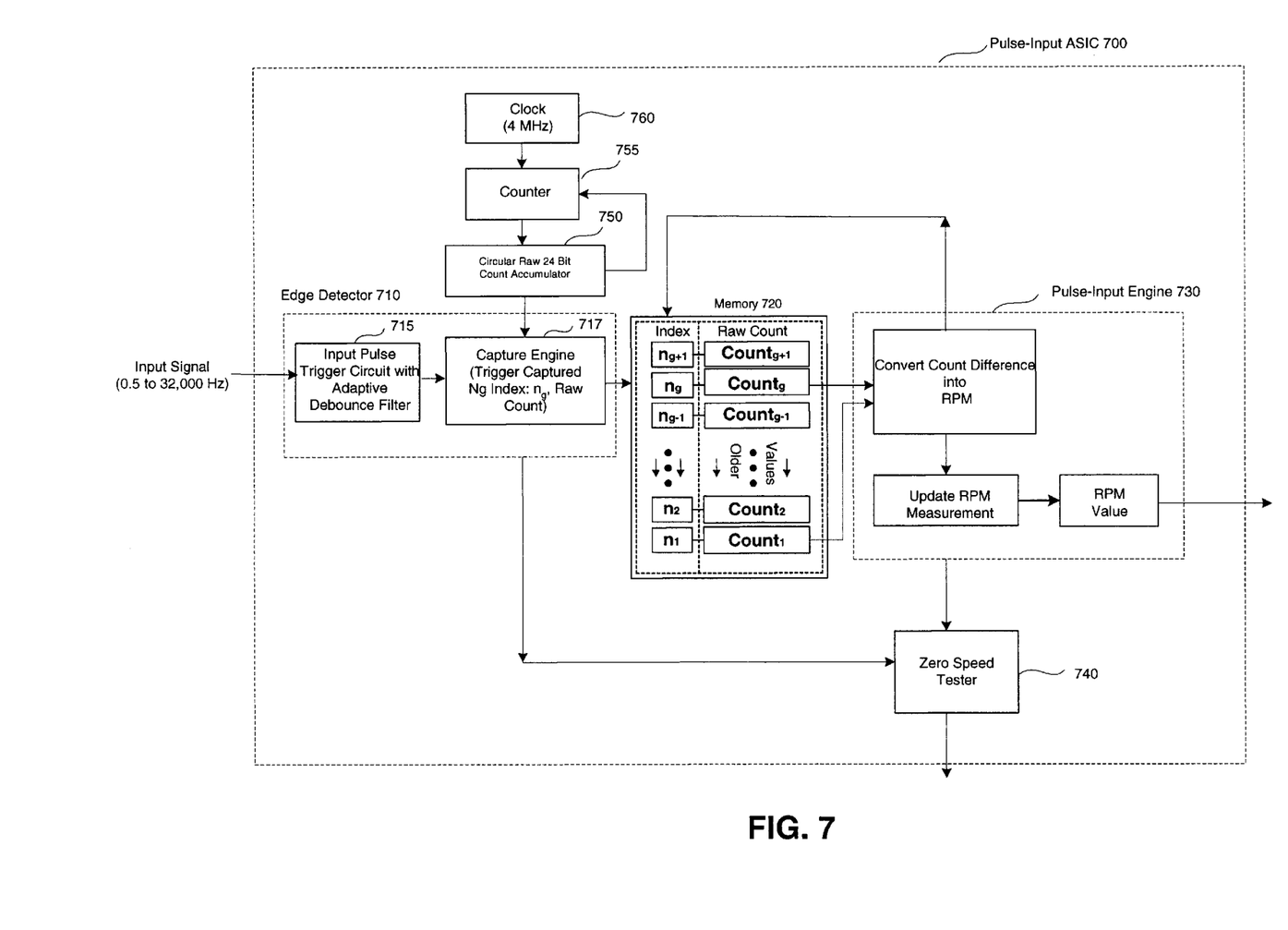
FIG. 7 shows a system block diagram of a pulse-input ASIC, according to an embodiment of the invention.

FIG. 7 shows a system block diagram of a pulse-input ASIC, according to an embodiment of the invention. Pulse-input ASIC 700 can correspond, for example, to the pulse-input ASIC 137 shown in FIGS. 1 and 4. As shown in FIG. 7, pulse-input ASIC 700 includes edge detector 710, memory 720, pulse-input engine 730, zero-speed tester 740, count accumulator 750, counter 755 and clock 760. Although pulse-input ASIC 700 is shown as an ASIC, other embodiments are possible where this component is analog and/or digital circuitry.

Edge detector 710 includes input pulse trigger circuit 715 and capture engine 717. Capture engine 717 is coupled to count accumulator 750, which in turn is coupled to counter 755. Counter 755 is also coupled to clock 760. Capture engine 717 is also coupled to memory 720, which in turn is coupled to pulse-input engine 730. Zero speed tester 740 is coupled to both edge detector 710 and pulse-input engine 730.

Figure 8:
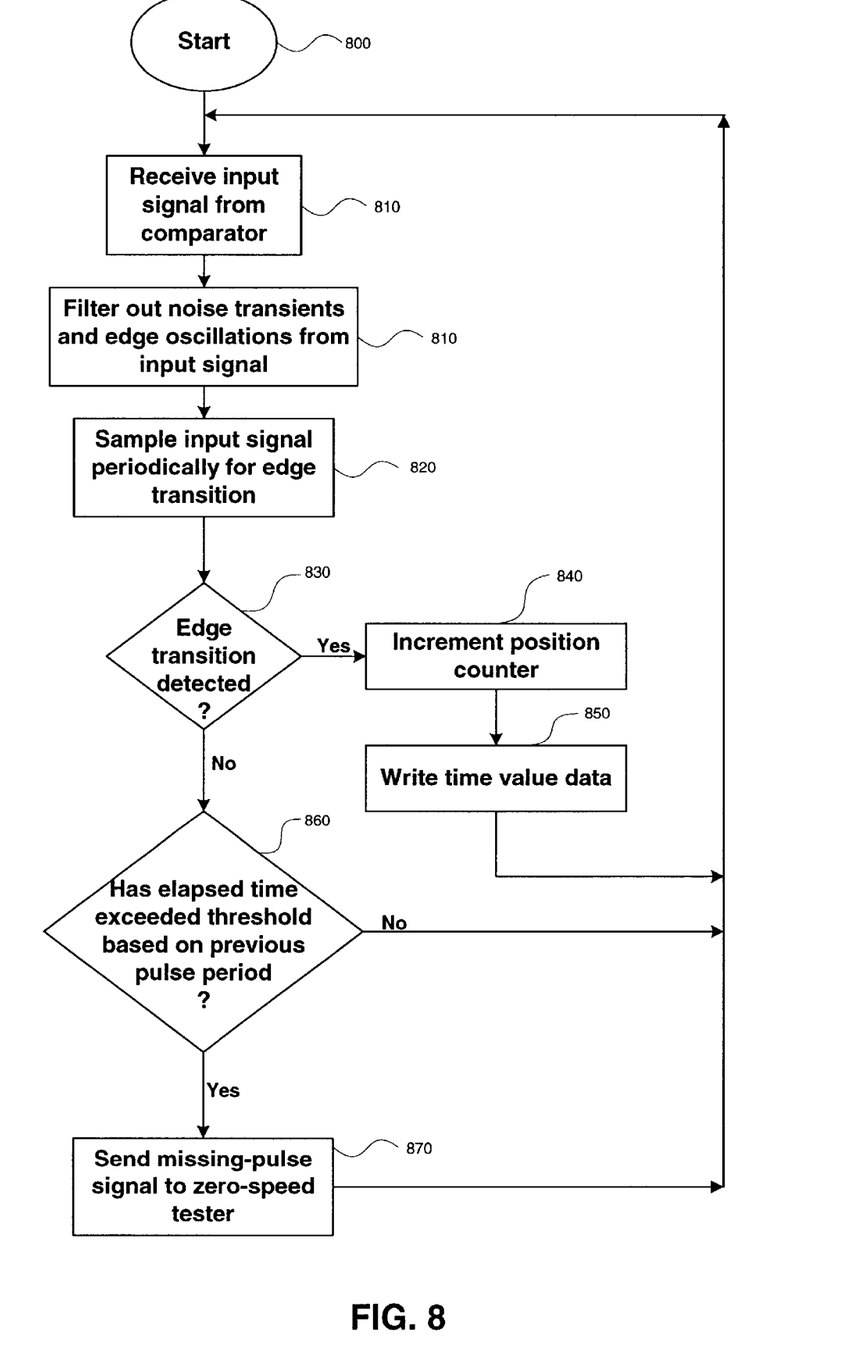
FIG. 8 shows a flowchart of the operation of a capture engine of an edge detector, according to an embodiment of the invention.

FIG. 8 shows a flowchart of the operation of a capture engine of an edge detector, according to an embodiment of the invention. At step 800, the process begins. At step 810, input-pulse trigger circuit with adaptive debounce filter 715 receives the input signal from comparator network 600. At step 815, the adaptive debounce filter of input-pulse trigger circuit 715 filters out noise transients and edge oscillations associated with the received pulse-input signal.

Input-pulse trigger circuit 715 includes an adaptive debounce filter that filters out noise transients and edge oscillations associated with the received pulse-input signal. The adaptive debounce filter can be, for example, implemented in hardware or software within the input-pulse trigger circuit 715. For example, the adaptive debounce filter can be implemented in software (e.g., using VHSIC Hardware Description Language (VHDL) software), which is then complied into hardware within, for example, an ASIC. The adaptive debounce filter can have an associated adaptive debounce filter length, for example, of eight times the period of the previous pulse of the input signal. Thus, for this embodiment, an input signal can accelerate at most by a factor of eight from the previous input signal. In other words, the period of an input signal can increase at most by a factor of eight from the period of the input signal for a previous pulse. The initial adaptive debounce filter length can be set to, for example, to 12.6 $\mu$sec if the measurement system is just starting up, if a missing pulse is detected (as described below in reference to step 870) or if the detected speed of the gear drops below a detectable minimum (e.g., below 0.5 Hz). The specific adaptive debounce filter length can subsequently change as the operation of the input-pulse trigger circuit 715 continues.

Figure 9:
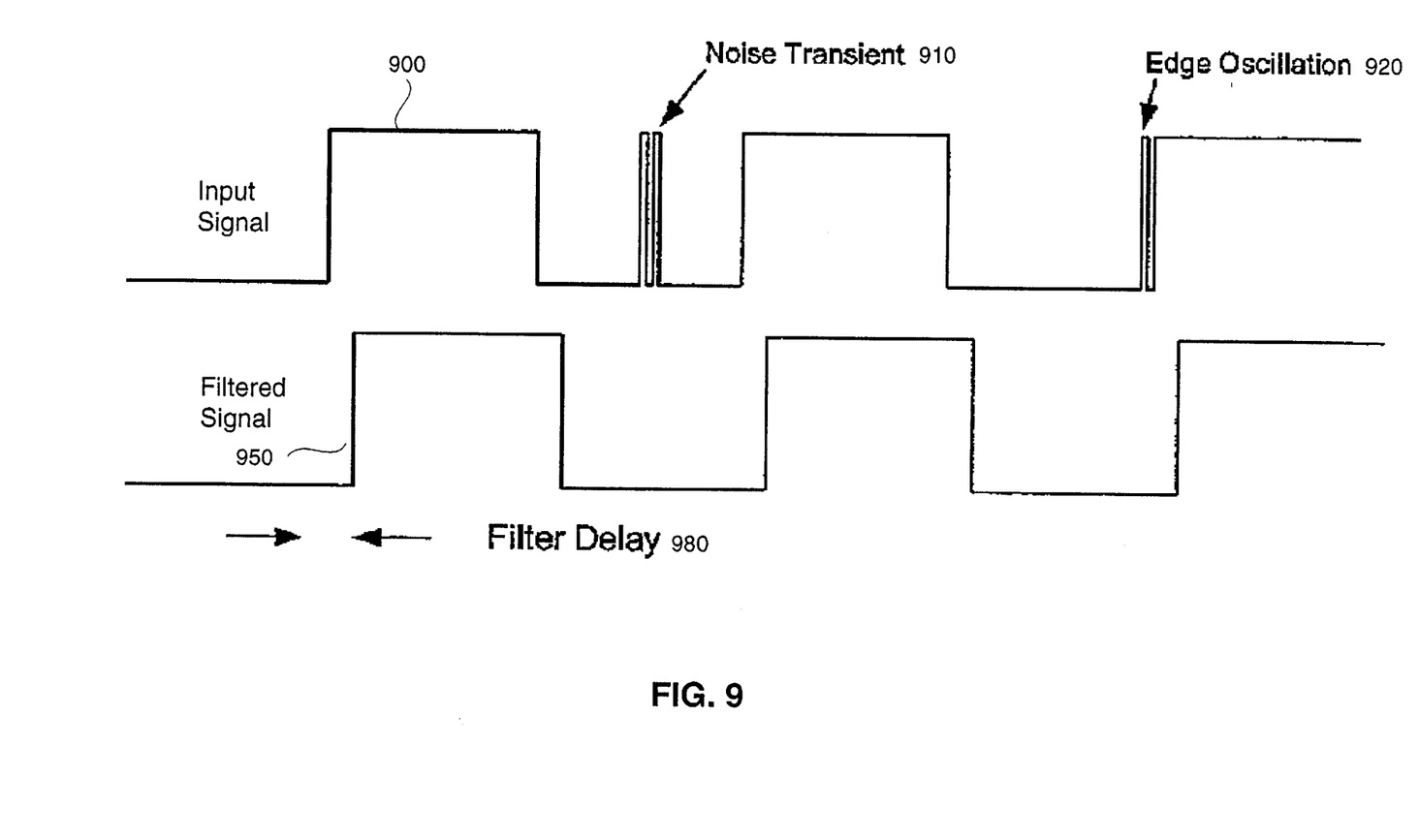
FIG. 9 shows an example of an input data signal and a filtered data signal based on an adaptive debounce filter, according to an embodiment of the invention.

FIG. 9 shows an example of an input signal and a filtered signal based on an adaptive debounce filter, according to an embodiment of the invention. As shown in FIG. 9, input signal 900 can typically include spurious edge transitions such as a noise transient 910 and an edge oscillation 920. Filtered signal 950 shows the input signal 900 after it has filtered by the adaptive debounce filter. Note that the filtered signal 950 is shifted in time from the input signal 900 by an amount corresponding to the filter delay 980. The noise transient 910 and the edge oscillation 920 of the input signal have been removed from the filtered signal 950. Consequently, such undesirable transients are less likely to be mistakenly identified as pulses associated with the gear teeth. Accordingly, the calculated time values are more likely to be accurately associated with pulses associated with the gear teeth.

Returning to FIG. 8, at step 820, capture engine 717 receives the filtered input signal from input-pulse trigger circuit 715 and periodically samples the input signal for edge transitions. Capture engine 717 can sample either the raising edge transitions or the trailing edge transitions from the input signal. At conditional step 830, capture engine 717 determines whether an edge transition was detected. If an edge transition was detected, the process proceeds to step 840. At step 840, a position counter within the capture engine 717 is incremented. At step 850, the time value associated with the detected edge transition from the input signal is provided to memory 720. The time value can be, for example, a 24-bit time value based on a counter signal received at the capture engine 717 by the count accumulator 750.

The time value can be stored in memory 720 having, for example, in a circular array memory structure. The circular array can be, for example, an $N_g$ by 24-bit array, where $N_g$ equals the maximum number of gear teeth allowed on the gear being measured. The circular array can therefore store pulses associated with one or more revolutions. In this embodiment, for example, gear 10 has 256 teeth; $N_g$ is 256; and 256 time values are stored by memory 720 in a circular manner. Once 256 time values, corresponding to one complete revolution pattern of the gear, have been stored in memory 720, new time values can be stored over the previously stored time values in a circular manner. The time values stored by memory 720 are provided to pulse-input engine 730. In another embodiment, for example, the gear has 60 teeth; the circular array can store four revolutions of the gear for a total of 240 pulses within the 256 fields within the array memory structure.

Returning to conditional step 830, if an edge transition was not detected, the process proceeds to conditional step 860. At conditional step 860, capture engine 717 determines whether the elapsed time from the last detected edge transition exceeds a threshold. If the elapsed time from the last detected edge transition does not exceed the threshold, the process proceeds to step 810.

If the elapsed time from the last detected edge transition exceeds the threshold, the process proceeds to step 870. The threshold can be, for example, based on the frequency of the input signal. For example, the threshold can be one fourth of the frequency of the input signal, or the four times the previous time period between pulses. If no new pulse is detected within an elapsed time period that exceeds the threshold, then it is assumed that a pulse is missing. At step 870, a missing-pulse signal is sent to the zero-speed tester 740. The zero-speed tester 740 can then perform an input test whereby a test-pulse signal is generated and verified through the comparator network 134. In particular, the switches shown in FIG. 4 can be used to send a pulse from the zero-speed test 740 to perform the input test.

In one embodiment, when a missing pulse is detected, the missing-pulse signal is provided to an indicator, which quickly indicates to the user than a missing pulse has been detected. The missing-pulse indication can be terminated once a valid input signal is detected. The input signal is set zero, however, after a timeout period has elapsed with detecting a valid input signal. The timeout period allows the user to wait for a period of time before shutting down the equipment associated with the gear being measured (e.g., a power plant associated with a turbine gear being measured).

In another embodiment, when missing pulses are intermittently detected, the missing-pulse signal can be used to diagnose whether the input signal has a problem or is noisy. In this embodiment, the missing-pulse indication can be toggled to indicate that the measurement system has a noise or sensor problem.

As described above, pulse-input engine 730 receives the time values stored in memory 720. Pulse-input engine 730 measures the pulse-to-pulse delays based on these received time values. In other words, pulse-input engine 730 receives time values indicative of detected edge transitions in the received input signal, and then calculates variations the times between adjacent edge transitions.

The pulse-input engine 730 calculates the pulse-to-pulse delays differently based on a predefined threshold, which relates to speed of the gear rotation and the number of gear teeth. Thus, when the gear is rotating slowing, the pulse-to-pulse delay can be measured on a per pulse basis so that a new value is calculated for every gear tooth. When the gear is rotating faster, the pulse-to-pulse delay can be averaged over multiple pulses so that a new value is calculated over multiple gear teeth. The faster the gear rotating, the more gear teeth will rotate past sensor 110 for a given time period.

Calculating the pulse-to-pulse delays differently based on a predefined threshold provides the additional benefit of optimizing the measurement accuracy when the gear is rotating relatively slowly or relatively quickly while also providing a relatively quick measurement response time. In particular, measurement accuracy should be greater for higher gear rotation rates. For example, for gear rotation rates from 2,000 RPM to 32,000 RPM, accuracy with less than a 0.01% error is desirable while, for gear rotation rates from 0.5 RPM to 2,000 RPM, accuracy with less than a 0.1% error is acceptable to achieve quick measurement response. In this embodiment, the desired accuracies are maintained while providing a relatively quick measurement response such as, for example, in the 100 msec range. In critical control applications, such as those for a high power turbine, this relatively quick measurement response advantageously detects problems quickly so that the measured system can be controlled quickly.

There are several possible sources of error for the RPM measurements of a rotating gear, including for example, errors due to data sampling, errors due to gear imperfections, and errors due to changing angular velocity. As described below, the pulse-input ASIC 700 samples the input signal at a given sampling rate (e.g., 4 MHz). Thus, sampling as many gear teeth as possible can minimize the errors caused by the data sampling. At the same time, the measurement response time should not exceed a desired time. Thus, by calculating the pulse-to-pulse delays differently based on a predefined threshold, errors due to data sampling can be minimized for higher gear rotation rates while the measurement response time can be maintained for lower gear rotation rates.

Regarding errors due to gear imperfection, the gears being measured inherently have imperfections in their shape and construction, which results in an amount of time jitter for every measurement. This in turn results in measurement errors because time jitter directly relates into RPM measurement errors. Consequently, calculating the pulse-to-pulse delays over multiple pulses (i.e., over multiples of the number of gear teeth), when a predefined threshold is exceeded, reduces the jitter from the measurement because edge detection can be triggered on the same event for each measurement. At the same time, calculating the pulse-to-pulse delays on a per-pulse basis (i.e., over a single gear tooth) when a predefined threshold is not exceeded allows the system to measure slowly rotating gears. Thus, accuracy of the speed measurement is optimized for both cases.

Regarding errors due to changing angular velocity, certain types of systems to be measured (e.g., diesel engines) operate with changing angular velocity. For example, a diesel engine having four cylinders and a flywheel produces an accelerate-decelerate type of pattern having an average RPM. Rather than measuring and averaging the RPM over an extended period of time to obtain an accurate measure of the RPM, measuring around the entire gear or multiples of the entire gear allows an accurate RPM measurement within a desired measurement response time. Thus, accuracy of the speed measurement is optimized both when a predefined threshold is exceeded and when the predefined threshold is not exceeded.

Calculating the pulse-to-pulse delays differently based on a predefined threshold can be implemented using hysteresis. This allows minimizes any unnecessary oscillation between measuring on a per-pulse basis and measuring over multiple pulses.

Figure 10:
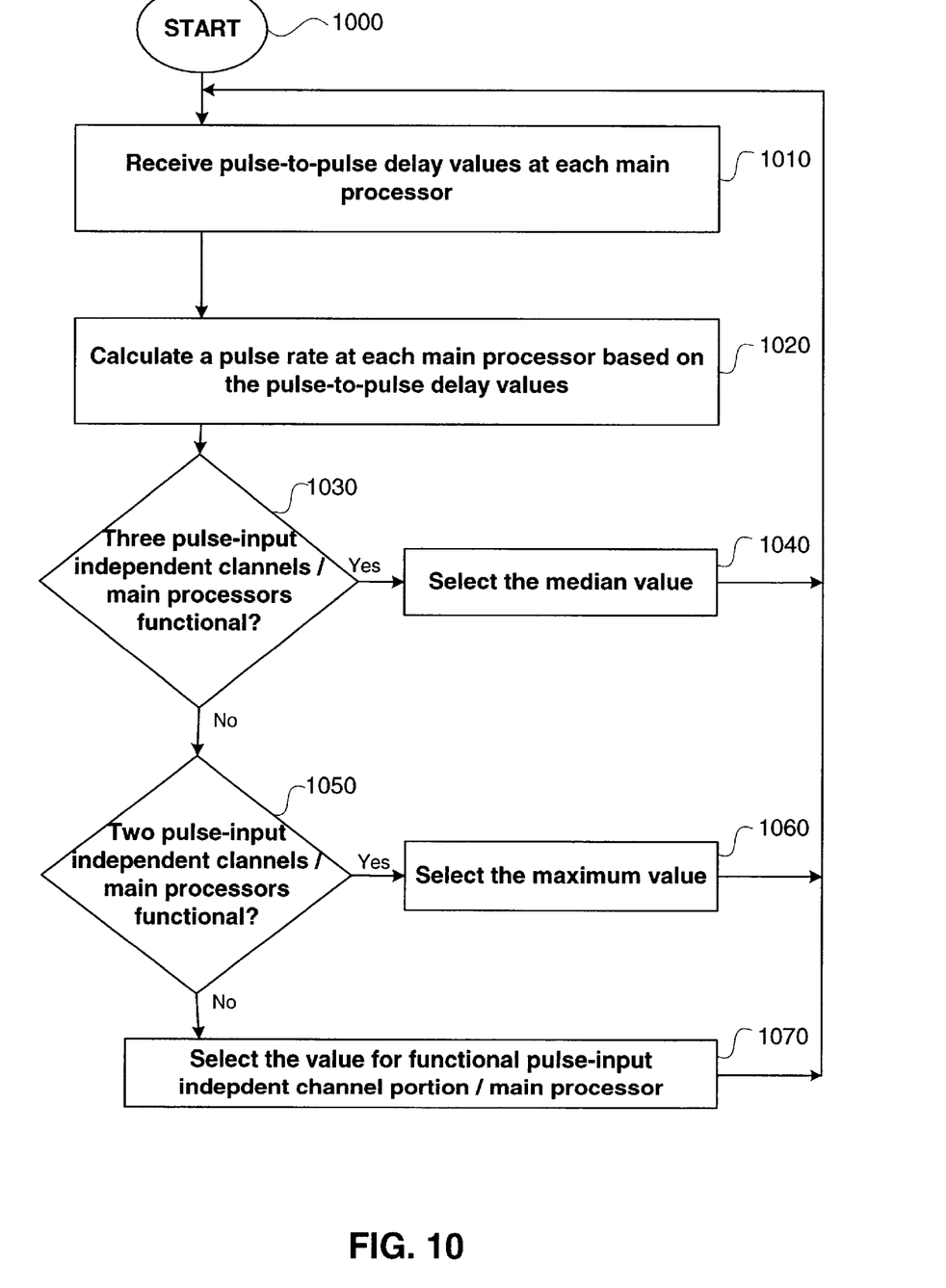
FIG. 10 shows a flowchart of the operation of the main processors, according to an embodiment of the invention.

FIG. 10 shows a flow chart of the operation of the main processors, according to an embodiment of the invention. At step 1000, the process begins. At step 1010, the pulse-to-pulse delay values are received at each of the main processors 140, 150 and 160. For example, as shown in FIG. 2, the pulse-input modules 135 A, B and C provide pulse-to-pulse delay values to main processors 140, 150 and 160, respectively. At step 1020, each of the main processors 140, 150 and 160 calculates a pulse rate based on the pulse-to-pulse delay values received at that main processor. The pulse rate corresponds to the RPM of the gear 10 (shown in FIG. 2).

At conditional step 1030, a determination is made as to whether the three independent channels within the pulse-input module (e.g., pulse-input legs 132 and I/O controllers 135) and main processors 140, 150 and 160 are functional. If the three independent channels within the pulse-input module and main processors 140, 150 and 160 are not functional, the process proceeds to conditional step 1050. One possible indication that an independent channel within the pulse-input module is not functional is, for example, that the corresponding main processor 140, 150 or 160 exceeds a threshold of accuracy in relationship to the voted value for a predefined time period.

If the three independent channels within the pulse-input module and main processors 140, 150 and 160 are functional, the process proceeds to step 1040 where the median value is selected. For example, if the main processor 150 received the lowest value, main processor 140 received the middle value and main processor 160 received the highest value, then the value from main processor 140 is selected. The remaining values for main processors 150 and 160 are discarded for this analysis time.

At conditional step 1050, a determination is made as to whether two of the three independent channels within the pulse-input module (e.g., pulse-input legs 132 and I/O controllers 135) and corresponding main processors 140, 150 and 160 are functional. If two of the three independent channels within the pulse-input module and corresponding main processors 140, 150 and 160 are not functional, the process proceeds to conditional step 1070. If two of the three independent channels within the pulse-input module and corresponding main processors 140, 150 and 160 are functional, the process proceeds to step 1060 where the higher value is selected and the lower value is discarded. Selecting the highest pulse rate (corresponding to the highest RPM value measured for the gear) assumes the worst case thereby maximizing safety. For example, for a turbine having a gear being measured, it is safer to select the highest RPM value so that the potentially worst case of the turbine performance is considered. In an alternative embodiment, when two of the three independent channels within the pulse-input module and corresponding main processors are functional, those non-zero values are averaged and presented as the selected RMP value.

At step 1070, the value for the functional independent channel within the pulse-input module and the corresponding main processor 140, 150 or 160 is selected. This non-zero value is selected as the RPM value and the two zero values are discarded.

Although the process described in reference to FIG. 10 involved three a triple redundant system (e.g., having three independent input channels within the pulse-input module each being uniquely associated with one of three main processors), process can be applied to other configurations. For example, in a quadruple redundant system, the voting among the four main processors can be similar. For example, when all four main processors receive non-zero values for the pulse-to-pulse delay values, an average of the middle two values can be used. When fewer than all four main processors receive non-zero values for the pulse-to-pulse delay values, the process described in reference to FIG. 10 can be used.

Conclusion

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. An apparatus, comprising:
    an edge detector, the edge detector configured to receive an input signal and a counter signal, the edge detector further configured to send a plurality of time values based on the input signal and the counter signal, each time value from the plurality of time values being uniquely associated with a detected edge transition from the input signal;
    a memory coupled to the edge detector, the memory configured to receive from the edge detector the plurality of time values, the memory being configured to store the plurality of time values; and
    a pulse-input engine coupled to the memory, the pulse-input engine configured to measure a plurality of pulse-to-pulse delays based on the plurality of time values stored in the memory.

2. The apparatus of claim 1, wherein:
    the pulse-input engine is configured to measure the plurality of pulse-to-pulse delays on a per-pulse basis when a prior pulse-to-pulse delay is below a predefined threshold; and
    the pulse-input engine is configured to measure the plurality of pulse-to-pulse delays over a plurality of pulses when a prior pulse-to-pulse delay exceeds the predefined threshold.

3. The apparatus of claim 1, wherein:
    the input signal corresponds to a signal associated with a rotating gear having a plurality of gear teeth, each gear tooth from the plurality of gear teeth corresponding to an edge transition from the input signal.

4. The apparatus of claim 1, wherein:
    the edge detector further includes an input filter, the input filter includes a valid-data counter and a threshold selector, the input filter is configured to provide a valid indication when the valid-data counter exceeds a predetermined threshold, the threshold selector of the input filter is configured to select the predetermined threshold based on an input frequency associated with the input signal.

5. The apparatus of claim 1, further comprising:
    a zero-speed tester coupled to the edge detector and the pulse-input engine, the zero-speed tester being configured to receive a test signal from the edge detector and to send a test-pulse signal to a comparator coupled to the edge detector,
    the edge detector configured to send the test signal to the zero-speed tester when the edge detector measures a frequency of the input signal below a predetermined threshold.

6. The apparatus of claim 1, wherein the pulse-input engine is configured to check for an interval time between pulses from the input signal on a per-pulse basis, the pulse-input engine is configured to send a missing-pulse indication if the interval time exceeds a predetermined threshold, the predetermined threshold being based on a frequency of the input signal.

7. The apparatus of claim 1, wherein the edge detector further includes:
    an adaptive debounce filter having an associated debounce filter length greater than a length of a spurious edge transition, the adaptive debounce filter configured to adjust the associated debounce filter length based on a frequency of the input signal.

8. The apparatus of claim 1, wherein:
    the memory includes an input port and an output port, the input port of the memory being coupled to the edge detector, the output port of the memory being coupled to the pulse-input engine, the memory configured to store the time value for each detected edge transition in a circular manner.

9. The apparatus of claim 1, wherein the input signal has a plurality of pulses having a frequency between substantially 0.5 Hz and 32,000 Hz.

10. The apparatus of claim 1, further comprising:
    a second edge detector, the second edge detector configured to receive the signal and the clocked-timer signal, the second edge detector further configured to send its own time value for each detected edge transition from the input signal;
    a second memory coupled to the second edge detector, the second memory configured to receive from the second edge detector its own time value for each detected edge transition from the input signal, the second memory being configured to store the time value for each detected edge transition for the second edge detector;
    a second pulse-input engine coupled to the second memory, the second pulse-input engine configured to measure a pulse rate based on the time value for each detected edge transition stored in the second memory;
    a third edge detector, the third edge detector configured to receive the signal and the clocked-timer signal, the third edge detector further configured to send its own time value for each detected edge transition from the input signal;
    a third memory coupled to the third edge detector, the third memory configured to receive from the third edge detector its own time value for each detected edge transition from the input signal, the third memory being configured to store the time value for each detected edge transition for the third edge detector; and
    a third pulse-input engine coupled to the third memory, the third pulse-input engine configured to measure a pulse rate based on the time value for each detected edge transition stored in the third memory.

11. The apparatus of claim 10, further comprising:
    a first processor coupled to the pulse-input engine, the first processor calculating a pulse rate based on the pulse-to-pulse delay from the pulse-input engine;
    a second processor coupled to the second pulse-input engine and the first processor, the second processor calculating a pulse rate based on the pulse-to-pulse delay from the second pulse-input engine; and
    a third processor coupled to the third pulse-input engine, the first processor and the second processor, the third processor calculating a pulse rate based on the third pulse-to-pulse delay from the pulse-input engine,
    the first processor, second processor and the third processor calculating a voted pulse rate based on the pulse rate calculated by the first processor, the pulse rate calculated by the second processor, and the pulse rate calculated by the third processor.

12. The apparatus of claim 1, further comprising:
an input device coupled to the pulse-input engine, the input device configured to receive a sensor-type indicator, a gear-teeth-number indicator, an edge-type indicator and an active-sensor field-voltage indicator.

13. A method for determining a revolution rate for a gear, comprising:
performing the following steps for each of at least three subsystems operating in parallel:
detecting a plurality of edge transitions within an input signal based on a counter signal;
storing a time value for each edge transition from the plurality of edge transitions; and
calculating a plurality of pulse-to-pulse delays based on the time value for each edge transition from the plurality of edge transitions.

14. The method of claim 13, wherein:
the each pulse-to-pulse delay from the plurality of pulse-to-pulse delays is calculated on a per-pulse basis when a prior pulse-to-pulse delay is below a predefined threshold; and
the each pulse-to-pulse delay from the plurality of pulse-to-pulse delays is calculated over a plurality of pulses when a prior pulse-to-pulse delay exceeds the predefined threshold.

15. The method of claim 13, wherein each subsystem further performs:
measuring an interval time between a first edge transition and a second edge transition from the plurality of edge transitions; and
sending a missing-pulse indication if the interval time exceeds a predetermined threshold.

16. The method of claim 13, wherein each subsystem further performs:
detecting a test signal having a frequency below a predetermined frequency;
sending a zero-speed test pulse to a front-end comparator when the test signal is detected; and
suspending the storing step for the zero-speed test pulse when the test signal is detected.

17. The method of claim 13, wherein each subsystem further performs:
measuring an interval time between a first edge transition and a second edge transition from the plurality of edge transitions; and
filtering the first edge transition when the interval time is below a predetermined threshold, the predetermined threshold being based on a frequency of the input signal.

18. The method of claim 13, further comprising:
receiving a sensor-type indicator, a gear-teeth-number indicator and an edge-type indicator;
the calculating of the plurality of pulse-to-pulse delays being based on the sensor-type indicator, the gear-teeth-number indicator and the edge-type indicator.

19. The method of claim 18, further comprising:
receiving a field-voltage indicator when the sensor-type indicator indicates an active sensor.

20. A method for determine a revolution rate for a gear having a plurality of gear teeth including a first gear tooth and a second gear tooth different from the first gear tooth, comprising:
detecting a plurality of edge transitions within an input signal, the plurality of edge transitions including a first edge transition and a second edge transition, the first edge transition being associated with the first gear tooth, the second edge transition being associated with the second gear tooth;
storing a time value for each edge transition from the plurality of edge transitions; and
calculating a plurality of pulse-to-pulse delays based on the time value for each edge transition from the plurality of edge transitions.

21. The method of claim 20, wherein:
the first edge transition and the second edge transition are associated with a same rotation of the gear.

22. The method of claim 20, wherein:
the plurality of transitions includes a third edge transition, the third edge transition is associated with the first gear tooth,
the time value associated with the third edge transition is subsequent to the time value associated with the second edge transition and the time value associated with the first edge transition, the time value associated with the second edge transition is subsequent to the time value associated with the first edge transition.

23. The method of claim 20, wherein:
the detecting step, the storing step and the calculating step are performed separately for each of at least three subsystems operating in parallel.

24. The method of claim 20, wherein:
the each pulse-to-pulse delay from the plurality of pulse-to-pulse delays is calculated on a per-pulse basis when a prior pulse-to-pulse delay is below a predefined threshold; and
the each pulse-to-pulse delay from the plurality of pulse-to-pulse delays is calculated over a plurality of pulses when a prior pulse-to-pulse delay exceeds the predefined threshold.

25. The method of claim 20, further comprising:
measuring an interval time between a first edge transition and a second edge transition from the plurality of edge transitions; and
sending a missing-pulse indication if the interval time exceeds a predetermined threshold.

26. The method of claim 20, further comprising:
detecting a test signal having a frequency below a predetermined frequency;
sending a zero-speed test pulse to a front-end comparator when the test signal is detected; and
suspending the storing step for the zero-speed test pulse when the test signal is detected.

27. The method of claim 20, further comprising:
measuring an interval time between a first edge transition and a second edge transition from the plurality of edge transitions; and
filtering the first edge transition when the interval time is below a predetermined threshold, the predetermined threshold being based on a frequency of the input signal.

28. The method of claim 20, further comprising:
receiving a sensor-type indicator, a gear-teeth-number indicator and an edge-type indicator;
the calculating of the plurality of pulse-to-pulse delays being based on the sensor-type indicator, the gear-teeth-number indicator and the edge-type indicator.

29. The method of claim 28, further comprising:
receiving a field-voltage indicator when the sensor-type indicator indicates an active sensor.

* * * * *

UNITED STATES PATENT AND TRADEMARK OFFICE
CERTIFICATE OF CORRECTION

PATENT NO. : 6,711,513 B2
DATED : March 23, 2004
INVENTOR(S) : David R. Brown et al.

It is certified that error appears in the above-identified patent and that said Letters Patent is hereby corrected as shown below:

<u>Title page,</u>
Item [73], Assignee, replace "Ivensys Systems Inc." with -- Invensys Systems, Inc. --

Signed and Sealed this

Twenty-seventh Day of July, 2004

JON W. DUDAS
*Acting Director of the United States Patent and Trademark Office*